April 9, 1968      J. W. BATES      3,377,539
POLYPHASE INVERTER
Original Filed Oct. 12, 1962      3 Sheets-Sheet 1
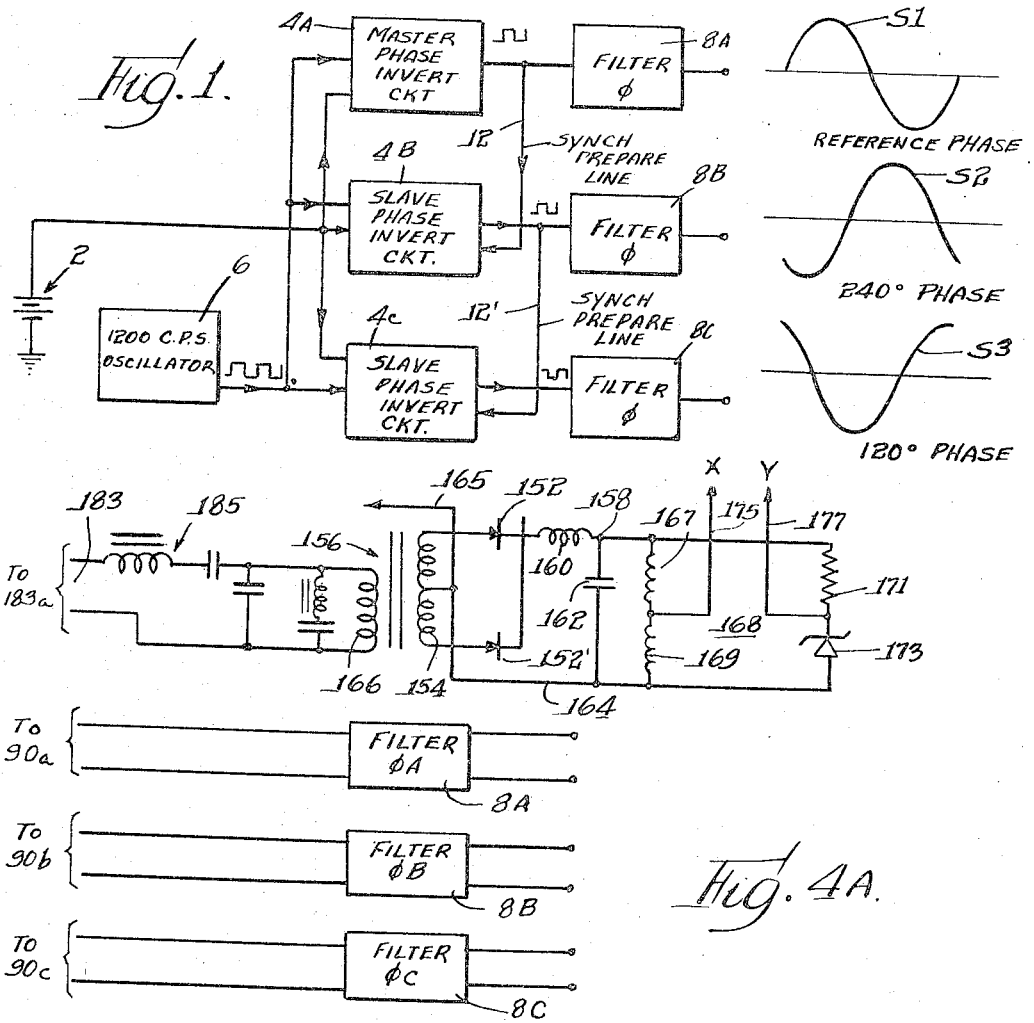
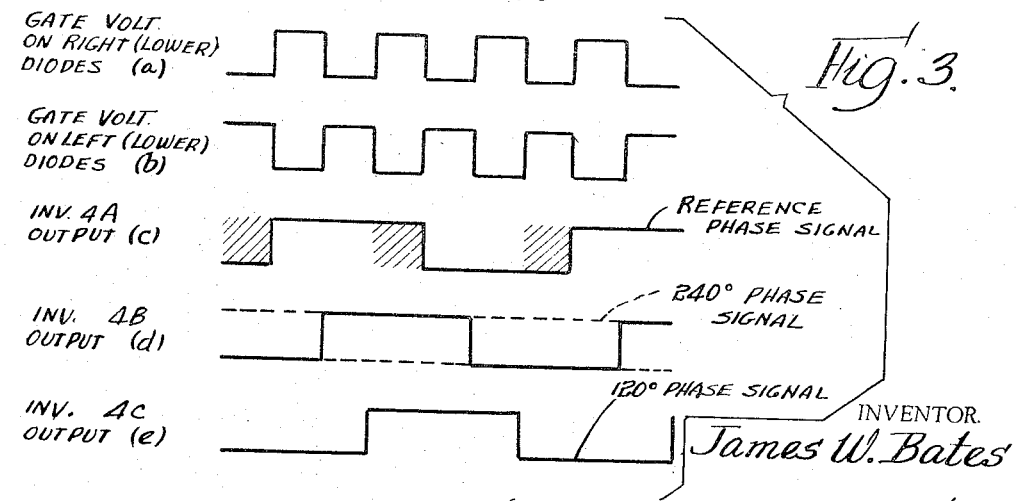
INVENTOR.
James W. Bates
By: Wallenstein, Spangenberg & Hattis
Attys.

April 9, 1968 J. W. BATES 3,377,539
POLYPHASE INVERTER
Original Filed Oct. 12, 1962 3 Sheets-Sheet 2

INVENTOR.
James W. Bates
BY
Wallenstein, Spangenberg & Hattis
attys.

United States Patent Office 3,377,539
Patented Apr. 9, 1968

3,377,539
POLYPHASE INVERTER
James W. Bates, Palos Verdes, Calif., assignor to Gulton Industries, Inc., Metuchen, N.J., a corporation of New Jersey
Continuation of application Ser. No. 230,078, Oct. 12, 1962. This application June 29, 1966, Ser. No. 562,937
6 Claims. (Cl. 321—5)

This application is a continuation of Ser. No. 230,078, filed Oct. 12, 1962, now abandoned.

This invention relates to circuits for converting direct current (DC) to alternating current (AC). Such circuits are commonly referred to as inverter circuits. More particularly the invention relates to an inverter circuit for converting direct current to polyphase alternating current.

It is old and well known in the art to produce an alternating signal from direct current by means of an inverter circuit comprising an output transformer having primary and secondary windings and switch means for alternately coupling a source of direct current in opposite directions through the primary winding upon successive actuation of the switch means which induces an alternating current in the secondary winding.

It is an object of the present invention to provide a simple, efficient and reliable polyphase inverter system which converts a direct current to a plurality of square wave or sinusoidal alternating current signals of the same frequency but of different phase, as, for example, three AC signals which differ in phase from one another by 120°.

A related object of the present invention is to provide a polyphase inverter system as just described wherein the inverters utilize electronic switches, most advantageously transistors and/or gated diodes.

Another object of the present invention is to provide a polyphase inverter system as described wherein the inverter system includes a square wave oscillator inverter circuit for each signal phase, and wherein the oscillator circuits are synchronized in a manner which provides precisely phased AC output signals.

Still another object of the present invention is to provide a polyphase inverter system as just described wherein the square wave oscillator inverter circuits are synchronized from a common oscillator and the desired phasing between the output signals is maintained despite minor variations in the frequency of the common oscillator.

A further object of the present invention is to provide a polyphase inverter system as above described which is capable of supplying polyphase power to relatively heavy loads.

An over-all object of the present invention is to provide a polyphase inverter system which preferably accomplishes all of the above-mentioned objectives utilizing a minimum of parts to reduce costs and improve circuit reliability.

In accordance with one aspect of the present invention, a separate inverter circuit is provided for each of the desired output AC signals, one of the inverter circuits being referred to as a master inverter circuit and the other inverter circuits being referred to as slave inverter circuits. In the case where the inverter system is to produce three signals at a given frequency spaced 120° apart, there will be three inverter circuits operating at a relative phase displacement of 60° or 120° (the inversion of the 60° phase signal produces the 240° phase signal). In a manner to be explained, the inverter circuits are synchronized from a common oscillator preferably energized from the source of direct current (DC) voltage to provide a synchronizing signal having a frequency preferably which is an integral number of times higher than the frequency of the desired output signal. For example, assuming an output signal frequency of 400 cycles per second, the common oscillator may have a frequency of, say, 1200 cycles per second. The switch means of each inverter circuit, which alternately couples the source of direct current voltage in opposite directions through the primary winding of the output transformer thereof upon successive actuations of the switch means, is controlled by switch control means which actuate the switch means of the various inverter circuits in a predetermined time sequence and at a frequency which produces the desired output frequency.

The switch control means referred to preferably includes means associated with each slave inverter circuit which means is responsive to the reversal of the AC signal in the output of the inverter circuit which operates immediately ahead of it by preparing the associated switch means for subsequent actuation by the output of the common oscillator. The master inverter circuit includes means for effecting successive actuation of the associated switch means at intervals encompassing a predetermined number of cycles of the output of the common oscillator. In the example involved, the interval between successive actuations of the switch means of the master inverter circuit, which represent 180° of the desired output frequency, amounts to one and one-half cycles of the exemplary 1200 master oscillator frequency. In effect, the master inverter circuit acts as a circuit which divides the frequency of the master oscillator by a given factor, in the example being described by a factor of three.

Upon reversal of the AC signal output of the master inverter circuit, one of the slave inverter circuits is prepared for actuation by a subsequent signal from the common oscillator at the proper interval. For example, in the example illustrated, where one-half cycle of the common oscillator represents 60° or ⅙ of the desired period or cycle of the output frequency, actuation of the switching means of the second inverter circuit one-half cycle of the common oscillator output after switching of the master inverter circuit will produce a 60° phase shift in the AC output of the aforesaid slave inverter circuit relative to the master inverter circuit output. A 60° phase shift is equivalent to a 240° phase shift if the signal involved is inverted by a proper connection of the secondary winding of the inverter output transformer.

In a similar manner, where a three phase system is involved, the third inverter circuit is responsive to the reversal of state of the output of the second inverter circuit by preparing the switching means for actuation one-half cycle of the common oscillator output after switching of the second inverter circuit.

Other aspects of the invention to be described relate to the means for controlling or synchronizing the switching means. These and other aspects of the invention will become apparent upon making reference to the specification to follow, the claims and the drawings wherein:

FIG. 1 is a box diagram illustrating the basic principal of operation of the present invention;

FIG. 2 is a circuit diagram of one form of the present invention;

FIGS. 3a through 3e illustrate different waveforms present in the circuit of FIG. 2; and FIGS. 4 and 4A considered together represent a circuit diagram of the most preferred form of the present invention.

Figure 4:
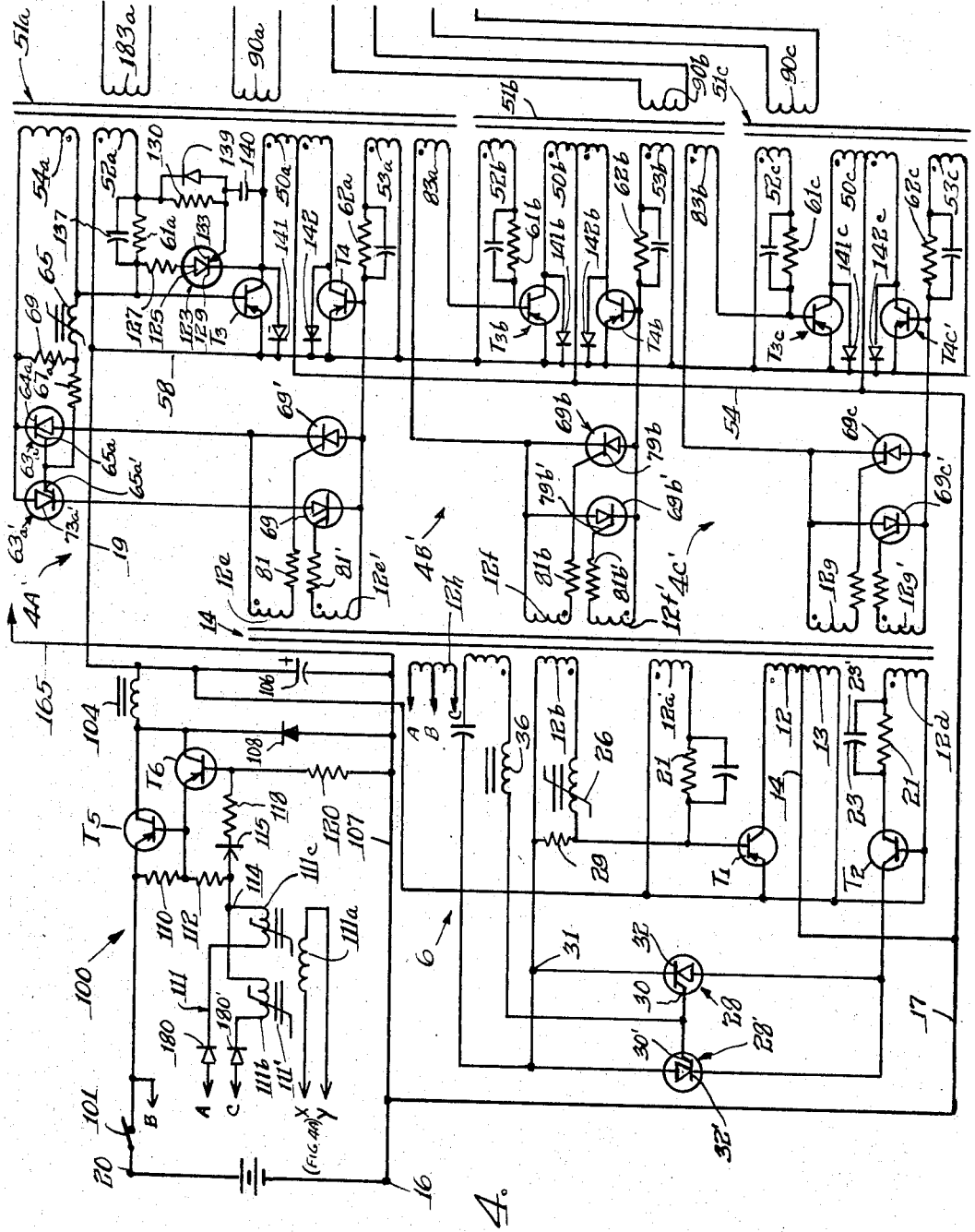

Referring now to FIG. 1, a source of direct current voltage 2 is provided as the primary energizing source for the inverter system. The source of direct current voltage 2 is coupled to a number of phase inverter circuits, three such inverter circuits 4A, 4B and 4C being shown in the exemplary circuit of FIG. 1 for providing three sinusoidal signals S1, S2 and S3 which differ in phase from one another by 120°. The inverter circuits 4A, 4B and 4C are synchronized to their desired frequency by a common oscillator generally indicated by reference numeral 6. The output of the oscillator 6 is fed to inputs of all three inverter circuits and, as above explained, has a frequency substantially higher than the desired frequency at the output of the phase inverter system. In the exemplary circuit, the master oscillator is assumed to have a frequency of 1200 cycles per second and the output frequency of the inverter system is assumed to be 400 cycles per second.

Each phase inverter circuit is preferably a square wave oscillator inverter circuit which has a free running frequency which is lower than the desired output frequency of the inverter system. The phase inverter circuit 4A, which is referred to as a master inverter circuit, acts as a frequency divider which provides a square wave output at the desired output frequency synchronized by the output of the common oscillator. The output of the master inverter circuit 4A is fed to a filter 8A which removes all the frequencies but the fundamental frequency to produce a sinusoidal output S1. If a square wave output was desired the filter circuit 8A would be omitted.

Each reversal of polarity of the output of the phase inverter circuit 4A is fed through a synchronization prepare line 12 to an input of the first slave inverter circuit 4B. (Although the line 12 is shown extending from the same output line as the line extending to the filter circuit 8A, it should be understood that this is a diagrammatic showing only and separate output windings of an output transformer of the inverter circuit, not shown in FIG. 1, would probably be used in a practical embodiment of the present invention.) This prepares the slave inverter circuit 4B for synchronization by a subsequent pulsation received from the common oscillator 6, such as the next successive half cycle pulsation of the common oscillator. In a similar way, when the slave inverter circuit 4B produces a reversal in the output thereof, an output signal is fed on a synchronization prepare line 12' to the other slave inverter circuit 4C in the three phase system being described, for preparing the same for a signal reversal operation upon receiving a subsequent pulsation from the master oscillator 6. In the case where sine wave signals are desired, the square wave outputs of the slave inverter circuits 4B and 4C are fed to filter circuits 8B and 8C which filter out all but the fundamental sinusoidal signals from the square wave output signals involved.

FIG. 3 illustrates some of the waveforms present in the various embodiments of the invention shown in the drawings. Thus, FIGS. 3a and 3b show two outputs of the common oscillator 6. FIG. 3c illustrates the square wave otuput of the master inverter circuit 4A on the same time base as the common oscillator output of FIG. 3a. The solid line portion of FIG. 3d illustrates the square wave output of the slave inverter circuit 4B at the input of the output transformer thereof, and the dashed line portion of FIG. 3d represents a 180° inversion of the solid line waveform which provides a square wave having a 240° phase displacement with respect to the master inverter circuit output and is obtained at the output of the slave inverter output transformer. FIG. 3e represents the output of the slave inverter circuit 4C having a 120° phase relative to the output of the master inverter circuit 4A.

Refer now to FIG. 2 which illustrates one exemplary form of the present invention. As there shown, the common oscillator 6 is a square wave oscillator circuit of unique design which has the advantages of simplicity and reliability. The circuit illustrated utilizes a pair of PNP transistors T1 and T2 whose collector electrodes are connected to opposite ends of the primary winding 12 of a transformer 14. The primary winding 12 has a center tap point 13 to which a conductor 14 extends connected to a negative bus 17 leading to the negative terminal 16 of the source of direct current voltage 2. The emitter electrodes of the transistors T1 and T2 are connected by a conductor 18 to a bus 19 leading to the positive terminal 20 of the source of direct current voltage 2.

The base electrode of the transistor T1 is connected through a resistor 21 in parallel with a capacitor 23 to the bottom end of feedback winding 12a. The other end of the winding 12a is connected to the line 18 leading to the positive bus 19.

A feedback winding 12b is provided on the transformer 14 which winding has a bottom end connected through a saturable reactor 26 to the base electrode of transistor T1. The upper end of the winding 12b is connected to a terminal 31 which is connected to one end of a parallel circuit comprising the anode and cathode or load terminals of a pair of gated diodes 28 and 28' also referred to as silicon controlled rectifiers. A resistor 29 is connected directly between the base electrode of transistor T1 and the terminal 31. The transformer 14 has a feedback winding 12d, the upper end of which is connected through a resistor 21' in parallel with a capacitor 23' to the base electrode of the transistor T2. The bottom end of the feedback winding 12d is connected to the line 18 leading to the positive bus 19.

A pair of gated diodes 28 and 28' are provided having cathode and anode electrodes 32–34 and 32'–34' connected in reverse relation between the aforementioned terminal 31 and a terminal 42 connected to the base electrode of the transistor T2. The anode and cathode electrodes of the gated diodes are connected in a loop circuit including the feedback windings 12b and 12d and the emitter to base circuit of the transistor T1 or T2 conducting at a given instant. The phases of the voltages in the transformer windings 12b and 12d are always in additive relationship to prepare one of the gated diodes 28 or 28' for conduction when the saturable reactor 26 saturates, the gated diodes being respectively so prepared during successive half cycles of the oscillator output. Conduction of one of the gated diodes will couple the voltages of the windings 12b and 12d to the emitter base circuit of the conducting transistor to render the same non-conductive.

The frequency at which the oscillator operates is determined by a resonant circuit including an inductance 36 and a capacitor 38 connected in series with a feedback winding 12c of the transformer 14. This series circuit including the feedback winding, the inductance 36 and capacitor 38 is connected between a line 35 connected to the control electrodes 30 and 30' of the gated diodes 28 and 28' and the terminal 31 connected to the cathode electrode 32 of the gated diode 28 and the anode electrode 34' of the gated diode 28'. The inductance and capacitor form a shock excitable resonant circuit which, in response to the steep wave front of the voltage induced in feedback winding 12c, produces a sinusoidal current at the desired frequency of the oscillator. The oscillator, in the absence of the gated diodes 28 and 28' and the associated resonant circuit, would oscillate at a frequency slightly lower than the frequency to which the resonant circuit is tuned.

The polarity of the sinusoidal voltage present on the line 35 extending to the control electrodes of the gated diodes will vary during successive half cycles of the oscillator output, and during a given half cycle is of a proper polarity to fire the gated diode 28 or 28' whose anode electrode is connected to a positive voltage from the feedback windings 12b and 12d. The gated diode 28 is a PNPN semi-conductor requiring a positive voltage between its control and cathode electrodes to fire the same, while the gated diode 28' is a NPNP semi-conductor requiring a negative voltage between the control and anode electrodes thereof to fire the same. It is thus apparent that the gated diodes 28 and 28' can be fired only during successive half cycles of the oscillator output.

The over-all operation of the square wave oscillator circuit 6 may be summarized as follows. When power is initially turned on, one of the transistors T1 or T2 will start conducting first. Whichever transistor this may be, the resulting flow of current through the associated half of the primary winding 12 will induce a voltage in the feedback windings 12a and 12d which, it will be noted, are connected in opposite sense between the base and emitter electrodes of the associated transistors, so that the voltages induced therein will be in a direction to sustain the conduction of the first to conduct transistor and to render the other transistor non-conductive. In the absence of external synchronization, saturation of the core of the transformer 14 will ultimately occur which results in the reversal of the voltage conditions of the transformer and the conductive states of the transistors. This free running oscillator action is overridden by the synchronization action of the control circuit including the gated diodes 28 and 28' which are fired at a frequency higher than the free running frequency of the circuit under control of the shock excitable resonant circuit including the inductance 36 and capacitor 38.

The shock excitable resonant circuit produces a sinusoidal voltage in the control circuits of the gated diodes at the desired frequency of the oscillator which voltage fires one of the gated diodes at the beginning of each half cycle of the oscillator output. When the polarity of the sinusoidal signal fed to the control electrodes 30 and 30' of the gated diodes is positive, the voltage conditions on the anode and cathode electrodes of the gated diode 28 is sufficient to effect the firing of the same upon saturation of the saturable reactor 26. When this occurs, the voltage conditions at the base electrodes of the transistors T1 and T2, due to the resulting coupling of the loop circuit voltage referred to before, will render the conducting transistor non-conductive and non-conducting transistor conductive upon saturation of the saturable reactor 26. This will result in a reversal of the polarity of the voltages induced in the transformer windings, which reversal will then render the conductive gated diode 28 or 28' non-conductive. In the absence of the saturable reactor 26, hole storage would allow a reverse current in the latter gated diode and thus upset the switching performance. The saturable reactor 26 prevents the sudden reversal of voltage across the gated diode 28 or 28' as this reversal drives the saturable core 26 from a saturated to an (momentary) unsaturated condition, which disrupts the feeding of energizing voltage to the latter gated diode and stops current flow due to hole storage. This reversal of voltage prepares the previously non-conductive gated diode for conduction as soon as the polarity of the voltage fed to the control electrode 30 or 30' thereof from the shock excited resonant circuit reverses. When the latter gated diode fires, this will effect another reversal of the oscillator circuit output which generates a new half cycle of the square wave output.

The oscillator circuit described will produce square wave signals in secondary winding pairs 12e–12e', 12f–12f' and 12g–12g' which are 180° out of phase as indicated in FIGS. 3a and 3b. The inverter circuits are square wave inverter oscillator circuits which operate similarly to the common oscillator circuit 6 except for the manner of synchronization thereof. Thus, the inverter circuits 4A, 4B and 4C are interconnected in such a way that they are synchronized at a sub-harmonic frequency of the common oscillator 6 and produce signals displaced in phase from one another to provide the desired polyphase signal output.

Inverter circuit 4A includes a pair of PNP transistors T3 and T4 having collector electrodes connected to opposite ends of a primary winding 50a of a transformer 51a. The primary winding 50a has a center tap point connected to a conductor 54 extending to the negative bus 17. The emitter electrodes of the transistors T3 and T4 are connected to a line 58 extending to the positive bus 19.

The transformer 51a has feedback windings 52a and 53a which are similar in function to the feedback windings 12a and 12d of the common oscillator 6. The lower end of the feedback winding 52a is connected through a resistor 61a to the base electrode of the transistor T3. The upper end of the feedback winding 53a is connected through a resistor 62a to the base electrode of the transistor T4. The other ends of the windings 52a and 53a are respectively connected to the positive conductor 58 and to the positive bus 19.

As in the case of the common oscillator 6, the transistors T3 and T4 will be rendered conductive during alternate half cycles of the desired square wave output of the circuit involved and in so doing will couple the source of direct current voltage in opposite directions through the primary winding 50a during successive half cycles of the inverter circuit operation. The conductive states of the transistors T3 and T4 are switched by a gated diode circuit which electrically connects the base electrodes of the transistors T3 and T4 together through a feedback winding 54a.

The bottom end of the feedback winding 54a is connected to the base electrode of the transistor T3 and the upper end thereof is connected to the cathode and anode electrodes 64a and 73a', respectively, of a pair of reverse connected gated diodes 63a and 63a'. The gated diode 63a is a PNPN type gated diode which requires a positive voltage between its control and cathode electrodes 65a and 64a to fire the same and the gated diode 63a' is an NPNP gated diode which requires a negative voltage between its control and anode electrodes 65a' and 73a' to fire the same. The bottom end of the feedback winding 54a is coupled to the control electrodes 65a and 65a' of the respective gated diodes through a saturable core reactor 65a and a resistor 67a. A resistor 68a interconnects the juncture of the reactor 65 and resistor 67a to the cathode and anode electrodes respectively of the gated diodes 63a and 63a'.

It is apparent that the gated diodes 63a and 63a' will be prepared for firing during alternate half cycles of the voltage induced in the winding 54a upon saturation of the saturable reactor 65a which acts as a gate which couplse the voltage of the transformer winding 54a to the control electrodes of the gated diodes. The saturable reactor 65a is designed so that the reactor will not saturate upon reversal of the polarity of the voltage in transformer winding 54a for a time interval not less than 120° or more than 180° relative to the inverter circuit output, which is just before the third half cycle of the oscillator output after the reversal takes place. In a manner to be more fully described, this delay action of the saturable reactor 65a produces a frequency divide-by-three action in the inverter circuit which will result in the firing of one of the gated diodes 63a or 63a' every one and one-half cycles (i.e., three half cycles) of the output of the common oscillator 6.

The anode and cathode electrodes of the gated diodes 63a and 63a' are respectively connected in series current aiding relationship with the anode and cathode electrodes 71a–75a and 71a'–75a' of an associated pair of reverse connected PNPN gated diodes 69a and 69a' whose control electrodes 79a and 79a' are coupled through resistors 81a and 81a' respectively to the secondary windings 12e and 12e' of the common oscillator output transformer 14. The connections from the control electrodes of the gated diodes 69a and 69a' to the transformer windings 12e and 12e' are such that the control electrodes will become positive during alternate half cycles of the common oscillator output. The cathode electrode 71a' of the gated diode 69a' and the anode electrode 75a of gated diode 69a are connected by conductor 77 to the base electrode of the transistor T4.

The gated diode connections described above are such that the voltages of the transformer windings 54a and 53a will always be applied in voltage additive relation through the emitter and base electrodes of one of the transistors T3 or T4, and the resultant voltage will be in the direction to render the gated diodes 63a–69a and 63a'–69a' conductive during alternate half cycles of the output of the inverter circuit when the saturable core 65a is saturated and the higher frequency signal on the control electrodes 79a or 79a' is of the requisite polarity. Upon the firing of either of the gated diode pairs 63a–69a or 63a'–69a', the conductive states of the associated transistors T3 and T4 will reverse to initiate a new half cycle of the output of the inverter circuit.

The transformer 51a also has an output winding 83a for controlling the operation of the slave inverter circuit 4B. In the exemplary embodiment of the invention being described, it will be recalled that the second inverter circuit 4B is to generate a square wave 240° (or 60°) out of phase with respect to the output of the master inverter circuit 4A.

The master and slave inverter circuits have substantially identical components which have been similarly numbered except that an alphabet character b or c has been added to the reference characters of the slave inverter circuits 4B and 4C. One difference between the master and slave inverter circuits is that the saturable reactor 65a of the master inverter circuit saturates between a 120°–180° time interval relative to the inverter output frequency while the saturable reactors 65b and 65c of the slave inverter circuits become saturated in a time interval related to the desired phasing of the slave inverter signals, namely just prior to the 60° point relative to the inverter output frequency, so that the initiation of the next pulsation of the common oscillator output (which is coincident with the 60° point) will trigger the slave inverter circuit involved.

The upper end of transformer winding 83a is connected to the cathode and anode electrodes respectively of a pair of gated diodes 63b and 63b' which correspond to the gated diodes 63a and 63a' in the master inverter circuit 4A. The bottom end of the control winding 83a is connected to the upper end of the feedback winding 54b of the output transformer 51b of the slave inverter circuit 4B. The bottom end of the winding 54b is connected to the bottom terminal of the saturable reactor 65b. The saturable reactor 65b is located in a loop circuit which includes resistor 69b and the windings 83a and 54b of the transformers 51a and 51b connected in series. The voltages in the transformer windings 83 and 54b are in additive relation whenever the master inverter circuit output reverses in polarity. The saturable reactor 65b will then be driven to saturation within the 60° interval referred to, which couples the voltage in the windings 83a and 54b to the control electrodes of the gated diodes 63b and 63b' to prepare one of the same for firing when the associated gated diodes 69b or 69b' receives the next pulsation from the common oscillator.

The relationship between the slave inverter circuits 4B and 4C is the same as the relationship between the master inverter circuit 4A and the slave inverter circuit 4B. Thus, the transformer 51b of the slave inverter circuit 4B has a winding 83b which is connected to transformer winding 54c and gated diodes 63c and 63c' of the slave inverter circuit as described above in connection with master inverter circuit winding 83a, slave inverter circuit winding 54b and gated diodes 63b and 63b'. The polarity of the output of the output of the slave inverter circuit 4C will therefor reverse 60° after the reversal of the output of the slave inverter circuit 4B.

The outputs of the inverter circuits 4A, 4B and 4C shown in FIG. 2 are taken across output windings 90a, 90b and 90c of transformers 51a, 51b and 51c and will comprise three square wave signals which have a relative phasing of 120°.

Refer now to the embodiment of the invention shown in FIGS. 4 and 4A which produces three amplitude regulated sinusoidal signals having a relative phasing of 120° and which has a slave inverter circuit 4B' and 4C' which operate without an upper pair of gated diodes like 63b–63b' and 63c–63c' and the associated saturable core reactors 65b and 65c present in the circuit of FIG. 2. The circuits of FIG. 2 and FIGS. 4–4A have many common elements which will be similarly numbered to avoid undue duplication of circuit description.

The phase inverter circuit shown in FIG. 4 includes a pulse width modulator circuit generally indicated by reference numeral 100 which provides amplitude regulation. This circuit is interposed between the positive terminal 20 of the source of direct current voltage 2 and the positive bus 19. The circuit 100 includes a pair of PNP transistors T5 and T6. The emitter electrode of the transistor T5 is connected to the positive terminal 20 and the collector electrode thereof extends through a filter choke 104 to the positive bus 19. A filter capacitor 106 extends between the output side of the filter choke 104 and a line 107 extending to the negative terminal 16 of the source of direct current voltage 2. A rectifier 108 is connected between the input side of the choke 104 and the line 107.

In a manner to be described, the transistor T5 is periodically rendered non-conductive for intervals such that the direct current output of the filter circuit which energizes the inverter circuits will maintain a predetermined average sinusoidal voltage output with varying load current. The transistor T5 will be in a conductive state when power is initially applied to the circuit upon closure of a switch 101 in series with the source of direct current voltage source 2. The circuitry for controlling the transistor T5 will now be described.

The base electrode of the transistor T5 is connected to the emitter electrode of the transistor T6. The collector electrode of the transistor T6 is connected to the collector electrode of the transistor T5. The base electrode of the transistor T5 is connected to the juncture point of the pair of resistors 110 and 112 whose opposite ends are respectively connected to the emitter electrode of the transistor T5 and the output terminal 114 of a magnetic amplifier switching circuit generally indicated by reference numeral 111 which is responsive to the sinusoidal output of the inverter system. The terminal 114 is connected to the anode of a rectifier 115 in turn connected through a resistor 118 to the base electrode of the transistor T6. A resistor 120 is connected between the base electrode of the transistor T6 and the line 107 leading to the negative terminal 16 of the source of direct current voltage 2.

From the circuit just described it is apparent that the transistor T5 is driven by the current gain developed by the other transistor T6 whose load circuit extends through the base circuit of the transistor T5. In the absence of any voltage fed to the base circuits of the transistors from the magnetic amplifier switching circuit 111, the voltages developed in the resistors 110, 112 and 120 by the flow of direct current from voltage source 2 will operate transistors T5 and T6 in a highly conductive state which couples the direct current output of the voltage source 2 to the positive bus 19 extending to the various inverter circuits.

To cause the square wave inverter circuit 4A' to start oscillating when it is operated into a heavy load, a current is sent through the base electrodes of one of the transistors T3 and the transformer primary winding 50a which will induce a voltage into the various windings of the transformer so that the circuit will be regenerative. To this end, an electronic switch in the form of a gated diode 123 is provided, the anode electrode 125 thereof being connected through a resistor 127 to the base electrode of the transistor T3. The cathode electrode 129 of the gated diode is connected to the juncture of the upper end of the primary winding 50a of the inverter output transformer 51a and the collector electrode of transistor T3.

The control circuit for the gated diode 123 includes the resistor 61a and a resistor 130 connected in series between the base electrode of the transistor T3 and the control electrode 133 of the gated diode 123. A capacitor 137 shunts the resistor 61a, and a rectifier 139 shunts the resistor 130. A back-biasing capacitor 140 is connected between the resistor 130 and the upper end of the primary winding 50a of the transformer 51a.

When power is first applied to the circuit, it is apparent that a positive voltage will be applied to the control electrode 133 of the gated diode 123 to effect the firing thereof to establish a circuit extending from the positive line 19, through the emitter and base electrodes of the transistor T3, resistor 127, anode and cathode electrodes of the gated diode 123 and the primary winding 50a to the negative bus 17. The resultant flow of base current will establish a highly conductive condition between the emitter and collector electrodes of the transistor T3 to start the operation of the inverter circuit 4A'. The resultant voltage induced in the winding 52a by the initiating of the conduction of the transistor T3 will make the bottom end of the feedback winding 52 negative with respect to the upper end thereof to continue to maintain conduction of the transistor T3. When the transistor T3 is fully conductive, the voltage conditions in the circuit will be such that a voltage at the base electrode of transistor T3 will be negative with respect to the voltage at the collector electrode thereof so that the anode of the gated diode 123 will be negative with respect to the cathode thereof to render the same non-conductive. The gated diode 123 must be rendered non-conductive after initial starting of the inverter circuit or else the gated diode will maintain the transistor T3 in a conductive state. When the gated diode 123 is rendered non-conductive, the rectifier 139 will conduct to charge the capacitor 140 negative. When the transistor T3 becomes non-conductive and the voltage conditions on the winding 52a reverse, the gated diode 123 will be held in a non-conductive state by the back bias applied thereto from the capacitor 140. The negative charge lost on the capacitor 140 during the non-conduction of the transistor T3 is replaced during the next half cycle when the rectifier 139 is conducting again.

The only other addition to the master inverter circuit 4A' worthy of mention is the addition of reverse current bypass rectifiers 141 and 142 respectively connected between the opposite ends of the primary winding 50a and the positive line 58.

Since the inverter circuit 4A' operates in substantially the same way as the circuit 4A previously described, a further description of this circuit will not now be given.

As previously indicated, the slave inverter circuits 4B' and 4C' have gated diode circuits which are much simpler than the gated diode circuits of the corresponding inverter circuits 4B and 4C in the embodiment of the invention shown in FIG. 2. The main difference between these circuits is the omission of the upper pair of gated diodes 63b–63b' and 63c–63c' and their associated control circuits including the saturable reactors 65b and 65c. The associated transformer windings 54b and 54c are also omitted in the circuit of FIG. 4. This modification is made possible by the selection of a common oscillator frequency which has a period equal to the desired phasing of the signals produced by the inverter system which, in the three phase exemplary embodiment of the invention being described, is 120°. On the other hand, the inverter system of FIG. 2 is operable with a wide variety of frequencies due to the delay action obtainable with saturable reactors and the associated gated diodes 63b'–63b' and 63c–63c'.

As illustrated in FIG. 4, the control winding 83a of the master inverter circuit 4A' which controls the operation of the slave inverter circuit 4B' has one end connected directly to the base electrode of the transistor T3b and another end connected to the cathode and anode electrodes respectively of the PNPN gated diodes 69b and 69b' associated with the oscillator output transformer windings 12f and 12f'. The phasing of the voltages induced in the windings 12f and 12f' is such that, at the instant of reversal of the current in the winding 83a of the master inverter circuit transformer, the polarity of the square wave control voltages fed to the control electrodes 79b or 79b' of the gated diode prepared for firing is opposite to that required to fire the same. However, during the next successive half cycle of the common oscillator, the polarity of this voltage will be proper to fire the gated diode involved.

The slave inverter circuit 4C' is substantially the same circuit as the slave inverter circuit 4B' and responds to the reversal of current in the control winding 83b of the slave inverter circuit 4B' in the same manner as just described with respect to the inverter circuit 4B', and so a further description thereof will not be given.

As in the case of the master inverter circuit 4A', the slave inverter circuits 4B' and 4C' have reverse current bypass rectifiers 141b and 142b, and 141c and 142c.

As previously indicated, amplitude regulation is obtained by means of controlling the off time periods of the transistor T5 in the pulse width modulation circuit 100 by means of the magnetic amplifier switching circuit 111. The magnetic amplifier switching circuit 111 is controlled by a voltage sensing circuit (FIG. 4A) including a full wave rectifier section comprising a pair of rectifiers 152 and 152' connected between opposite ends of a secondary winding 154 of a transformer 156 and a common point 158. A filter circuit comprising an inductance 160 and a capacitance 162 are connected between the common point 158 and a line 164 leading to the center tap of the transformer winding 154. The center tap is connected by a conductor 165 to the negative bus 107. The filter circuit provides a direct current voltage which is proportional to the average value of a sinusoidal voltage induced in the winding 154 from the primary winding 166 of the transformer 156. This direct current voltage is developed across the capacitor 162 and is applied to a bridge circuit 168 having a first branch comprising series connected resistors 167 and 169 and a second branch connected in parallel with the first branch and comprising a resistor 171 and a Zener diode 173. The output of the bridge circuit is taken across a pair of conductors 175 and 177 connected respectively to the juncture of resistors 167 and 169 in one of the branches and the resistor 171 and Zener diode 173 in the other branch. The Zener diode 173 provides a fixed reference voltage across the Zener diode, and the resultant voltage appearing across the conductors 175 and 177 represents the difference between the Zener diode voltage and the voltage across the resistor 169. This voltage constitutes a control voltage fed by the conductors 175 and 177 to the terminals X and Y in the magnetic amplifier switching circuit 111 forming part of the pulse width modulation circuit in FIG. 4. The magnetic amplifier switching circuit includes a saturable core 111' having a winding 111a connected between the conductors 175 and 177. When the amplitude of the sinusoidal voltage fed to the voltage sensing circuit from transformer 156 is above a predetermined reference level, the bridge circuit output is unbalanced to feed direct current to the magnetic amplifier winding 111a in a direction which speeds up or advances the saturation time of the saturable core 111', and when the amplitude of this voltage is below this reference level the bridge circuit output is unbalanced in the opposite direction to feed direct current to the winding 111a in a direction which slows down or delays the saturation time of the saturable core 111'.

The saturable core 111' has a pair of control windings 111b and 111c having one of their ends connected to the previously mentioned terminal 114 connected to the base control circuit of the transistor T6. The other ends of the windings 111c and 111d are respectively coupled by rectifiers 180 and 180' to the opposite ends of a winding 12h of the common oscillator output transformer 14. The rectifiers 180 and 180' are so arranged in the circuit that they will couple a positive voltage or current to the left-hand end of the magnetic amplifier windings 111b and 111c during successive half cycles of the oscillator output.

The voltage coupled to these windings 111b and 111c will be effectively coupled to the base circuits of the transistors T5 and T6 to render them non-conductive when the saturable core saturates. As above indicated, the timing of this saturation is a function of the amplitude of the sinusoidal voltage fed to the sensing circuit transformer 156.

In the exemplary circuit being described, the input to the voltage sensing circuit is obtained from an output winding 183a of the output transformer 51a of the inverter circuit 4A' across which winding one phase of the square wave output of the inverter system appears. The winding 183a is connected across the input of a conventional filter circuit (FIG. 4A) generally indicated by reference numeral 185 which filters out substantially all frequency components of the square wave outputs induced in the latter windings except the fundamental sinusoidal components thereof. As shown, the filter circuit 185 includes a number of tuned circuits which applies the fundamental sinusoidal component of the square wave thereof across the primary winding 166 of the sensing circuit transformer 156.

With the pulse width modulation and voltage sensing circuits which are described above, the non-conductive intervals of the transistors T5 and T6 will maintain at a fairly constant level the sinusoidal output of the inverter circuit provided the loads on the three phase outputs of the inverter system described remain at comparable values.

The variously phased outputs of the master and slave inverter circuits 4A', 4B' and 4C' appear across output windings 90a, 90b and 90c of the transformers 51a, 51b and 51c. These windings may be interconnected in pairs, if desired, in a manner well known in the art to cancel out third harmonic components or, as in the simplified version of the output circuits shown in FIG. 4A, may be directly fed to the individual filter circuits 8A, 8B and 8C. Also, if a Y three phase arrangement is desired, the outputs of the filter circuits may be connected through transformers (not shown) having output windings connected to provide a neutral connection in addition to three output connections in a manner well know in the art.

The present invention provides a highly effective and reliable inverter system for providing polyphase square wave or sinusoidal signals from direct current. The inverter system of the invention is designed to produce a precise phasing of the inverter circuit outputs synchronized by a common oscillator, and has the capability of providing appreciable amounts of power where this is desired.

It should be understood that numerous modifications may be made in the preferred forms of the invention describes above without deviating from the broader aspects of the invention.

What I claim as new and desire to protect by Letters Patent of the United States is:

1. A polyphase inverter system operating from a source of DC voltage for generating a number of signals at a frequency $f1$ having respectively different phases, said circuit comprising: a source of DC voltage; master and slave inverter circuits for respectively generating reference phase and dependent phase signals, each of the inverter circuits including an output transformer having primary and secondary winding means, switch means for alternately coupling current from said source of DC voltage in opposite directions through said primary winding means upon successive actuations thereof, wherein an AC signal is induced in the secondary winding means, the output transformer of each inverter circuit having a saturable core and feedback and additional winding means thereon, said switch means of each inverter circuit comprising electronic switching devices each with control and load terminals, means connecting the feedback winding means of each output transformer with the control terminals of the associated switch means for forming a square wave multivibrator circuit with a free running frequency which is slightly lower than the desired output frequency $f1$ of the inverter circuit and where the switch means are operated in opposite conductive states and reversal of the conductive state of one of the switch means will trigger the multivibrator circuit to reverse the conductive states of the switch means; a common oscillator energized from said source of DC voltage and providing a signal output for synchronizing the actuation of said inverter switch means and having a frequency which is an integral number of times higher than the frequency $f1$; respective switch control means for controlling the actuation of the switch means of the various inverter circuits in a predetermined time sequence at the frequency $f1$, the switch control means of each inverter circuit including reverse parallel connected gated diodes having control and load electrodes, the load electrodes of the gated diodes being coupled to at least part of the additional winding means of the associated output transformer to prepare a different one of the gated diodes for firing each half cycle of the inverter circuit output and coupled to the control terminals of the associated switch means to effect triggering of the multivibrator circuit involved when one of the gates diodes is fired, and means coupling the output of said common oscillator to the control electrodes of the gated diodes of each inverter circuit; said switch control means of each slave inverter circuit including switch operation prepare means responsive to the reversal of the AC signal in the output of the inverter circuit which operates immediately ahead of it for preparing the associated switch means for subsequent actuation by the output of said common oscillator fed thereto, said switch operation prepare means of each slave inverter circuit including means coupling at least part of the additional winding means of the inverter circuit which operates immediately ahead of it to prepare one of the gated diodes of the slave inverter circuit involved for firing by a subsequent half cycle of the common oscillator output; and the switch control means of said master inverter circuit including frequency determining means operating completely independently of the slave inverter circuits for effecting successive actuation of the master inverter switch means independently of the slave inverter circuits at intervals encompassing a predetermined number of half cycles of the output of said common oscillator, said frequency determining means including means for delaying the effect of the voltage in the additional winding means of the master inverter circuit output transformer on the gated diodes of the master inverter circuit for several half cycles of the common oscillator output.

2. The polyphase inverter system of claim 1 wherein said delaying means of the frequency determining means of the master inverter circuit is a saturable core device which has a gate winding connected between said additional winding means and the control electrodes of the gated diodes, the core device becoming saturated to pass the output of the inverter circuit involved when the instantaneous value of the output exceeds a given value.

3. The polyphase inverter system of claim 1 wherein each inverter circuit has two pairs of reverse parallel connected gated diodes each having load electrodes and a control electrode, the load electrodes of the correspondingly oriented gated diodes of the pair of gated diodes being connected in series circuit relation; said delaying means of said master inverter circuit comprises a saturable core device having a gate winding connected between said additional winding means and the control electrodes of one of the pairs of parallel connected gated diodes of the master inverter circuit which gate winding effects saturation of the core device when the signal fed thereto exceeds a given value to pass the signal to the control electrodes of the associated gated diodes to prepare one of the gated diodes for firing in synchronism with the output of the common oscillator; and said switch operation prepare means of each slave inverter circuit comprises a saturable core device with a gate winding coupled between the output of the inverter circuit which operates immediately ahead of it and the control electrodes of one of the pairs of parallel connected gated diodes of the slave inverter circuit involved which gate winding effects saturation of the core device when the signal fed thereto exceeds a given value to pass the signal to the control electrodes of the associated gated diodes to prepare one of the gated diodes for firing in synchronism with the common oscillator output, the output of said common oscillator being connected to the control electrodes of the other pair of parallel connected gated diodes associated with each inverter circuit to fire one of the same and trigger the firing of the corresponding prepared gated diode of the other pair of gated diodes.

4. A polyphase inverter system operating from a source of DC voltage for generating a number of signals at a frequency $f1$ having respectively different phases, said circuit comprising: a source of DC voltage; master and slave inverter circuits for respectively generating reference phase and dependent phase signals, each of the inverter circuits including an output transformer having primary and secondary winding means, switch means for alternately coupling current from said source of DC voltage in opposite directions through said primary winding means upon successive actuations thereof, wherein an AC signal is induced in the secondary winding means; a common oscillator energized from said source of DC voltage and providing a signal output for synchronizing the actuation of said inverter switch means and having a frequency which is an integral number of times higher than the frequency $f1$; respective switch control means for controlling the actuation of the switch means of the various inverter circuits in a predetermined time sequence at the frequency $f1$; the switch control means of each slave inverter circuit including switch operation prepare means responsive to the reversal of the AC signal in the output of the inverter circuit which operates immediately ahead of it for preparing the associated switch means for subsequent actuation by the output of said common oscillator fed thereto, said switch operation prepare means of each slave inverter circuit including a saturable core device with a gate winding coupled to the output of the inverter circuit which operates immediately ahead of it, the core device saturating to pass the signal to the slave inverter circuit involved after a predetermined delay period to prepare the same for actuation by the next cycle of the output of said common oscillator occurring after said delay period; and the switch control means of said master inverter circuit including frequency determining means operating completely independently of the slave inverter circuits for effecting successive actuation of the master inverter switch means independently of the slave inverter circuits at intervals encompassing a predetermined number of half cycles of the output of said common oscillator.

5. A polyphase inverter system for generating a number of signals at a frequency $f1$ having respectively different phases, said circuit comprising: master and slave inverter circuits for respectively generating alternating polarity reference phase and dependent phase signals, each of said inverter circuits including switch means to be synchronized by an externally generated signal, a common oscillator providing an alternating polarity synchronizing signal output coupled to said switch means for synchronizing the actuation thereof and having a frequency which is an integral number of times higher than the frequency $f1$, respective switch control means for actuating said switch means of the various inverter circuits in a predetermined time sequence at the frequency $f1$, said switch control means of each slave inverter circuit including switch operation prepare means responsive to the reversal of the output of the inverter circuit which operates immediately ahead of it for preparing the associated switch means for subsequent actuation by the output of said common oscillator fed thereto, said switch control means of said master inverter circuit including frequency-determining means operating completely independently of the slave inverter circuits for effecting successive actuation of the associated switch means independently of the slave inverter circuits at intervals encompassing a predetermined number of half cycles of the output of said common oscillator, said frequency determining means including delay means responsive to each reversal of the AC signal in the output of the master inverter circuit for preparing the master inverter switch means for actuation by the next cycle of the output of said common oscillator after a predetermined delay period after said output reversal.

6. A polyphase inverter system for generating a number of signals at a frequency $f1$ having respectively different phases, said circuit comprising: master and slave inverter circuits for respectively generating alternating polarity reference phase and dependent phase signals, each of said inverter circuits including switch means to be synchronized by an externally generated signal, a common oscillator providing an alternating polarity synchronizing signal output coupled to said switch means for synchronizing the actuation thereof and having a frequency which is an integral number of times higher than the frequency $f1$, respective switch control means for actuating said switch means of the various inverter circuits in a predetermined time sequence at the frequency $f1$, said switch control means of each slave inverter circuit including switch operation prepare means responsive to the reversal of the output of the inverter circuit which operates immediately ahead of it for preparing the associated switch means for subsequent actuation by the output of said common oscillator fed thereto, said switch control means of said master inverter circuit including frequency-determining means operating completely independently of the slave inverter circuits for effecting successive actuation of the associated switch means independently of the slave inverter circuits at intervals encompassing a predetermined number of half cycles of the output of said common oscillator, gating means for controlling the feeding of the output of said common oscillator to the master inverter switch means, and said frequency determining means including delay means responsive to each reversal of the AC signal in the output of the master inverter circuit by closing said gating means after a predetermined delay period after said output reversal to enable the next cycle of the output of the common oscillator to actuate said master inverter switch means.

References Cited

UNITED STATES PATENTS

| | | | |
|---|---|---|---|
| 2,824,274 | 2/1958 | Holt | 321—18 X |
| 2,916,687 | 12/1959 | Cronin | 321—5 |
| 3,060,363 | 10/1962 | Jensen | 321—5 |
| 3,136,957 | 6/1964 | Putkovich et al. | 321—5 X |
| 3,207,972 | 9/1965 | Love | 321—5 |

JOHN F. COUCH, *Primary Examiner.*

W. SHOOP, *Assistant Examiner.*